E. S. WINCHESTER.

Rock-Drill.

No. 6,620. Reissued Aug. 24, 1875.

Witnesses:

Donn Twitchell.

Will H. Dodge

Inventor:

E. S. Winchester.

by his Attys.

Dodge & Son.

UNITED STATES PATENT OFFICE.

EDWARD S. WINCHESTER, OF BOSTON, MASSACHUSETTS.

IMPROVEMENT IN ROCK-DRILLS.

Specification forming part of Letters Patent No. 165,646, dated July 13, 1875; reissue No. 6,620, dated August 24, 1875; application filed August 17, 1875.

*To all whom it may concern:*

Be it known that I, EDWARD S. WINCHESTER, of Boston, in the county of Suffolk and State of Massachusetts, have invented certain new and useful Improvements in Rock-Drills; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to engines for drilling rocks, usually termed rock-drills; and the invention consists in a novel construction of the valve and its ports to prevent the entrance of foreign substances through them into the steam-passages. It further consists in the combination, with the spring-arms of the valve, of rubber or other elastic material to increase their durability and prevent breakage; and it further consists in a novel construction and arrangement of the parts, whereby the engine is rendered less liable to stop in consequence of the valve not making its full movement, all as hereinafter more fully set forth.

Figure 1:
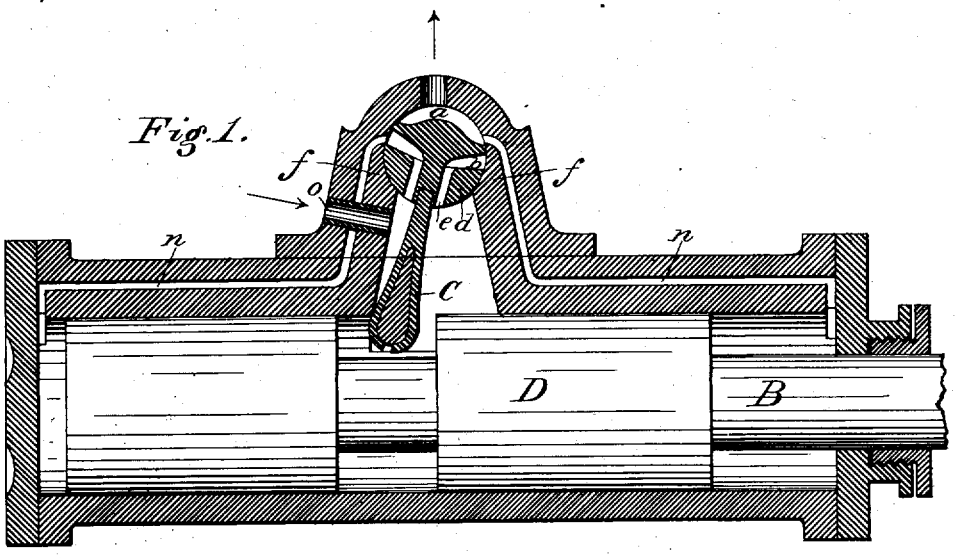
Figure 2:
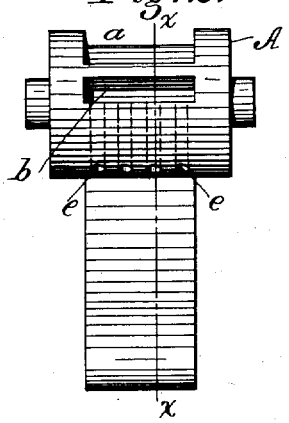
Figure 3:
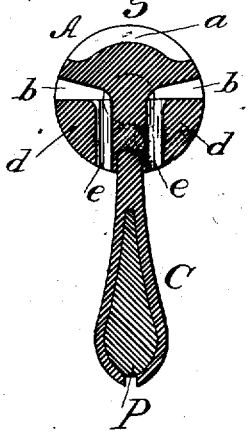

Figure 1 is a longitudinal section. Fig. 2 is a side elevation of the valve detached; and Fig. 3 is a transverse section of the same, taken on the line *x x* of Fig. 2.

In rock-drilling engines it often happens that fragments of rock or other foreign material accidentally enter the steam-passage when the hose or pipe is disconnected, and when the engine is started these fragments are driven into the ports or openings of the valve, and, catching between the edges of the valve and the passages in the cylinder, either break the latter or stop the engine, necessitating loss of time and repairs. To obviate this I construct my valve as represented in the drawings. As there shown, the passages *e*, which lead to the ports *b*, consist of a series of holes of less diameter than the port itself, so that nothing can enter that will not readily escape from the ports *b*. These holes may be round, as represented, or they may be oval, or they may be united, so as to form a narrow slot, less in size than the port *b*, though I prefer a series of holes instead of a slot, as they will obviously operate more perfectly to prevent the entrance of solid particles. The holes *e*, it will be observed, enter the ports *b* at nearly a right angle, so that any slender object, such as a nail or small bolt, which might enter the holes *e* cannot work through, as its front end would strike against the wall of the port, which would prevent its further passage. As the passages *e* are to be made of a size equal to the passages *n*, leading to the cylinder, it will be seen that any substance that can pass through the openings *e* will pass readily on into the cylinder, where particles of such size cannot create any sudden breakage, and from whence they can be removed at will.

The body of the valve A is cylindrical in form, made solid, and is seated in a correspondingly-formed cavity, as shown in Fig. 1. That portion of the surface of the valve between the openings *e* and the ports *b*, and designated by the letter *d* in Figs. 1 and 3, is made equal in extent, or greater than the semicircular wall *f*, against which it works, as shown in Fig. 1, so that, whatever position the valve may occupy, the edge of the openings *e* will never pass the edge of the wall *f*, and hence any object that will enter the openings *e* cannot be carried past the edge of the walls *f*, and by that means I guard against accidents from that source.

Another difficulty with this class of engines is their liability to stop at the forward stroke of the piston, in consequence of the drill striking the rock before the piston D has moved far enough to throw the valve a sufficient distance to admit the steam or air for the reverse stroke. To obviate this difficulty I arrange the inlet-passage O in such a position in relation to the broad flat arm or lever C of the piston D that the steam or compressed air, as it enters, will strike directly against the arm C, and thus assist to throw it forward, this arrangement being shown in Fig. 1. It will be observed, also, that the groove at the center of the piston D, in which the end of the arm C plays, is of such a size that when the piston has completed its stroke the arm C has still a short distance to move in order to complete its stroke, this additional movement of the arm being accomplished by the momentum of the valve and its arm, so that if the piston should stop a little short of its full stroke the valve will continue its motion until its stroke is completed, thus preventing the engine from stopping, as it otherwise would. On its back stroke there is nothing to prevent the piston from moving freely, and in that case the momentum of the valve is sufficient to complete its movement; but in moving forward, if the piston is stopped, the momentum of the valve will be less, and this is compensated by the pressure against the arm C of the inflowing current of steam or air entering through the opening O, whereby the movement of the valve is insured, so as to reverse the stroke and insure the continuous operation of the engine. The arm C of the valve is made, as represented in the drawings, of a flat piece of steel divided into two separate curved parts, which operate as a spring, so that when struck by the piston there will not be the liability of breaking by the sudden concussion, and also less jar than there would otherwise be; and to still further lessen the liability of breaking these spring-arms, and to render them more durable, I interpose between them a piece of rubber, P, as shown in Figs. 1 and 3. Instead of rubber, any other elastic material may be used, such as leather, or even wood, with beneficial results; but I consider rubber best adapted for the desired purpose.

By these several improvements I am enabled to produce an engine that is far less liable to become deranged or stopped, that is more perfect in its operation, and also more durable.

Having thus described my invention, what I claim is—

1. The solid plug-valve provided with the steam-passages *e*, less in diameter than the ports *b*, to prevent the entrance of fragments of rock or other foreign material.

2. The solid plug-valve provided with the ports *b*, with the steam-passages *e* arranged at right angles thereto, whereby elongated articles entering the passages *e* are prevented from passing through the ports *b*, as set forth.

3. In combination with the oscillating valve provided with the arm C, the inlet-passage O, arranged to deliver the inflowing steam or air directly against said arm, and thereby assist in completing the full movement of the valve, whereby the engine is prevented from stopping on its forward stroke when the piston stops short of its full movement, as set forth.

4. In combination with the spring-arms C of the valve, the rubber or other elastic filling P, substantially as and for the purpose set forth.

EDWARD S. WINCHESTER.

Witnesses:
W. H. WELCH,
W. A. TRIPP.